(12) United States Patent
Goerke et al.

(10) Patent No.: US 9,141,691 B2
(45) Date of Patent: *Sep. 22, 2015

(54) METHOD FOR AUTOMATICALLY INDEXING DOCUMENTS

(76) Inventors: Alexander Goerke, Kirchzarten (DE); Matthias Rabald, Kirchzarten (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/192,703

(22) Filed: Jul. 28, 2011
(Under 37 CFR 1.47)

(65) Prior Publication Data

US 2012/0078934 A1  Mar. 29, 2012

Related U.S. Application Data

(63) Continuation of application No. 12/106,450, filed on Apr. 21, 2008, now Pat. No. 8,015,198, which is a continuation of application No. 11/896,746, filed on Sep. 5, 2007, now abandoned, which is a continuation (Continued)

(30) Foreign Application Priority Data

Aug. 27, 2001 (EP) .................................... 01120429

(51) Int. Cl.
*G06F 17/30* (2006.01)
*G06K 9/00* (2006.01)

(52) U.S. Cl.
CPC ...... *G06F 17/30705* (2013.01); *G06K 9/00442* (2013.01)

(58) Field of Classification Search
USPC ......................................................... 707/765
See application file for complete search history.

(56) References Cited

U.S. PATENT DOCUMENTS

| 4,731,861 A | 3/1988 | Blanton et al. |
| 4,799,188 A | 1/1989 | Yoshimura |
| 4,864,501 A | 9/1989 | Kucera et al. |

(Continued)

FOREIGN PATENT DOCUMENTS

| EP | 0 320 266 | 6/1989 |
| EP | 0 572 807 | 12/1993 |

(Continued)

OTHER PUBLICATIONS

International Search Report issued in PCT/IB2010/003252, mailed Jan. 24, 2012.

(Continued)

*Primary Examiner* — Shyue Jiunn Hwa
(74) *Attorney, Agent, or Firm* — DLA Piper LLP US

(57) ABSTRACT

Methods and Systems for automatically indexing a set of base documents. Data defining all elements respectively contained within the base documents is indexed. The elements comprise an element to be checked and surrounding elements that surround the element to be checked. The received data is evaluated as to whether the element to be checked has the corresponding meaning, wherein training has been performed based on a training sample generated for base documents in which the element to be checked is surrounded by the surrounding elements and has the corresponding meaning. For those base documents where elements have been found to have the corresponding meaning, building an index indexing the base documents, the index comprising the elements having the corresponding meaning with a corresponding reference to the document in which each element is contained.

9 Claims, 4 Drawing Sheets

Related U.S. Application Data of application No. 11/620,628, filed on Jan. 5, 2007, now abandoned, which is a continuation of application No. 11/429,436, filed on May 8, 2006, now abandoned, which is a continuation of application No. 10/531,298, filed as application No. PCT/US02/27132 on Aug. 27, 2002, now abandoned.

(56) References Cited

U.S. PATENT DOCUMENTS

| | | | |
|---|---|---|---|
| 5,191,525 A | 3/1993 | LeBrun et al. | |
| 5,201,047 A | 4/1993 | Maki et al. | |
| 5,245,672 A | 9/1993 | Wilson et al. | |
| 5,267,165 A | 11/1993 | Sirat | |
| 5,276,870 A | 1/1994 | Shan et al. | |
| 5,278,980 A * | 1/1994 | Pedersen et al. | 1/1 |
| 5,344,132 A | 9/1994 | LeBrun et al. | |
| 5,537,491 A | 7/1996 | Mahoney et al. | |
| 5,546,503 A | 8/1996 | Abe et al. | |
| 5,550,931 A | 8/1996 | Bellegarda et al. | |
| 5,619,709 A | 4/1997 | Caid et al. | |
| 5,649,068 A | 7/1997 | Boser et al. | |
| 5,671,333 A | 9/1997 | Catlett et al. | |
| 5,675,710 A | 10/1997 | Lewis | |
| 5,689,620 A | 11/1997 | Kopec et al. | |
| 5,745,889 A | 4/1998 | Burrows | |
| 5,778,362 A | 7/1998 | Deerwester | |
| 5,787,201 A | 7/1998 | Nelson et al. | |
| 5,794,178 A | 8/1998 | Caid et al. | |
| 5,809,476 A | 9/1998 | Ryan | |
| 5,864,855 A | 1/1999 | Ruocco et al. | |
| 5,889,886 A | 3/1999 | Mahoney | |
| 5,918,223 A | 6/1999 | Blum et al. | |
| 5,937,084 A | 8/1999 | Crabtree et al. | |
| 5,956,419 A | 9/1999 | Kopec et al. | |
| 5,987,457 A | 11/1999 | Ballard | |
| 5,999,664 A | 12/1999 | Mahoney | |
| 6,006,221 A | 12/1999 | Liddy et al. | |
| 6,009,196 A | 12/1999 | Mahoney | |
| 6,043,819 A | 3/2000 | LeBrun et al. | |
| 6,047,299 A | 4/2000 | Kaijima | |
| 6,069,978 A | 5/2000 | Peairs | |
| 6,076,088 A | 6/2000 | Paik et al. | |
| 6,101,515 A * | 8/2000 | Wical et al. | 715/234 |
| 6,115,708 A | 9/2000 | Fayyad et al. | |
| 6,161,130 A | 12/2000 | Horvitz et al. | |
| 6,185,576 B1 | 2/2001 | McIntosh | |
| 6,188,010 B1 | 2/2001 | Iwamura | |
| 6,192,360 B1 | 2/2001 | Dumais et al. | |
| 6,212,532 B1 * | 4/2001 | Johnson et al. | 715/236 |
| 6,243,713 B1 | 6/2001 | Nelson et al. | |
| 6,275,610 B1 | 8/2001 | Hall, Jr. et al. | |
| 6,289,334 B1 | 9/2001 | Reiner et al. | |
| 6,324,551 B1 | 11/2001 | Lamping et al. | |
| 6,327,387 B1 | 12/2001 | Naoi et al. | |
| 6,453,315 B1 * | 9/2002 | Weissman et al. | 1/1 |
| 6,477,551 B1 | 11/2002 | Johnson et al. | |
| 6,574,632 B2 * | 6/2003 | Fox et al. | 1/1 |
| 6,611,825 B1 | 8/2003 | Billheimer et al. | |
| 6,622,134 B1 | 9/2003 | Sorkin | |
| 6,629,097 B1 * | 9/2003 | Keith | 1/1 |
| 6,665,668 B1 | 12/2003 | Sugaya et al. | |
| 6,665,841 B1 | 12/2003 | Mahoney et al. | |
| 6,732,090 B2 * | 5/2004 | Shanahan et al. | 1/1 |
| 6,741,724 B1 | 5/2004 | Bruce et al. | |
| 6,741,959 B1 | 5/2004 | Kaiser | |
| 6,772,164 B2 | 8/2004 | Reinhardt | |
| 6,785,810 B1 | 8/2004 | Lirov | |
| 6,944,340 B1 | 9/2005 | Shah | |
| 6,976,207 B1 | 12/2005 | Rujan et al. | |
| 6,983,345 B2 | 1/2006 | Lapir et al. | |
| 6,990,238 B1 | 1/2006 | Saffer | |
| 7,149,347 B1 | 12/2006 | Wnek | |
| 7,433,997 B2 | 10/2008 | Lapir et al. | |
| 7,440,938 B2 | 10/2008 | Matsubayashi et al. | |
| 7,472,121 B2 | 12/2008 | Kothari et al. | |
| 7,509,578 B2 | 3/2009 | Rujan et al. | |
| 7,610,281 B2 | 10/2009 | Gandhi et al. | |
| 7,720,721 B1 | 5/2010 | Goldstein et al. | |
| 7,805,446 B2 | 9/2010 | Potok et al. | |
| 7,865,018 B2 | 1/2011 | Abdulkader et al. | |
| 7,908,430 B2 | 3/2011 | Lapir | |
| 8,015,198 B2 | 9/2011 | Rabald et al. | |
| 8,051,139 B1 | 11/2011 | Musat | |
| 8,554,852 B2 * | 10/2013 | Burnim | 709/206 |
| 2001/0042083 A1 | 11/2001 | Saito et al. | |
| 2002/0022956 A1 | 2/2002 | Ukrainczyk et al. | |
| 2002/0023085 A1 | 2/2002 | Keith, Jr. | |
| 2002/0129015 A1 * | 9/2002 | Caudill et al. | 707/6 |
| 2002/0133476 A1 | 9/2002 | Reinhardt | |
| 2002/0156760 A1 | 10/2002 | Lawrence et al. | |
| 2002/0156816 A1 | 10/2002 | Kantrowitz et al. | |
| 2003/0099399 A1 | 5/2003 | Zelinski | |
| 2004/0049411 A1 | 3/2004 | Suchard et al. | |
| 2004/0243601 A1 | 12/2004 | Toshima | |
| 2004/0255218 A1 | 12/2004 | Tada et al. | |
| 2005/0021508 A1 | 1/2005 | Matsubayashi et al. | |
| 2005/0160369 A1 | 7/2005 | Balabanovic et al. | |
| 2006/0142993 A1 | 6/2006 | Menendez-Pidal | |
| 2006/0210138 A1 | 9/2006 | Hilton et al. | |
| 2007/0033252 A1 | 2/2007 | Combest | |
| 2007/0091376 A1 | 4/2007 | Calhoon et al. | |
| 2007/0244882 A1 | 10/2007 | Cha et al. | |
| 2007/0288882 A1 | 12/2007 | Kniffin et al. | |
| 2008/0040660 A1 | 2/2008 | Georke et al. | |
| 2008/0126335 A1 | 5/2008 | Gandhi et al. | |
| 2008/0208840 A1 | 8/2008 | Zhang et al. | |
| 2008/0212877 A1 | 9/2008 | Franco | |
| 2008/0252924 A1 | 10/2008 | Gangai | |
| 2009/0125529 A1 | 5/2009 | Vydiswaran et al. | |
| 2009/0198677 A1 | 8/2009 | Sheehy et al. | |
| 2009/0226090 A1 | 9/2009 | Okita | |
| 2009/0228777 A1 | 9/2009 | Henry et al. | |
| 2009/0274374 A1 | 11/2009 | Hirohata et al. | |
| 2010/0325109 A1 | 12/2010 | Bai et al. | |

FOREIGN PATENT DOCUMENTS

| | | |
|---|---|---|
| EP | 0 750 266 | 12/1996 |
| EP | 0809219 | 11/1997 |
| EP | 1049030 | 11/2000 |
| EP | 1 128 278 | 8/2001 |
| EP | 1 182 577 | 2/2002 |
| EP | 1 288 792 | 3/2003 |
| EP | 1 315 096 | 5/2003 |
| GB | 2172130 | 9/1986 |
| JP | 01-277977 | 11/1989 |
| JP | 02-186484 | 7/1990 |
| JP | 04-123283 | 11/1992 |
| JP | 07-271916 | 10/1995 |
| JP | 10-91712 | 4/1998 |
| JP | 11-184894 | 7/1999 |
| JP | 11-184976 | 7/1999 |
| JP | 2000-155803 | 6/2000 |
| JP | 2003-524258 | 8/2003 |
| JP | 2005-038077 | 2/2005 |
| JP | 2009-238217 | 10/2009 |
| WO | WO 88/01411 | 2/1988 |
| WO | WO 89/04013 | 5/1989 |
| WO | WO 91/10969 | 7/1991 |
| WO | WO 98/01808 | 1/1998 |
| WO | WO 98/47081 | 10/1998 |
| WO | WO 01 42984 | 6/2001 |
| WO | WO 01/63467 | 8/2001 |
| WO | WO 02/15045 | 2/2002 |
| WO | WO 03/019524 | 3/2003 |
| WO | WO 03/044691 | 5/2003 |

OTHER PUBLICATIONS

Written Opinion issued in PCT/IB2010/003252, mailed Jan. 24, 2012.
A. Dengal et al., "Chapter 8:: Techniques for Improving OCR Results", Handbook of Character Recognition and Document Image

(56) References Cited

OTHER PUBLICATIONS

Analysis, pp. 227-258, Copyright 1997 World Scientific Publishing Company.
Remy Mullot, "Les Documents Ecrits", Jan. 1, 2006, Lavoisier—Hermes Science, pp. 351-355, "Section 7.6.3 Reconnaissance des caracteres speciaux ou endommages".
L. Solan, "The Language of the Judges", University of Chicago Press, pp. 45-54, Jan. 1, 1993.
A. Krikelis et al., "Associative Processing and Processors" Computer, US, IEEE Computer Society, Long Beach, CA, US, vol. 27, No. 11, Nov. 1. 1994, pp. 12-17. XP000483129.
D. Frietag, "Information extraction from HTML: application of a general machine learning approach", Pro. 15th National Conference on Artificial Intelligence (AAAI-98); Tenth Conference on Innovative Applications of Artificial Intelligence, Proceedings of the Fifteenth National Conference on Artificial Intelligence, Madison, WI, USA pp. 517-523, SP002197239 1998, Menlo Park, CA, USA, AAAI Press/MIT Press, USA ISBN: 0-262-51098-7.
"East text search training", Jan. 2000.
International Search Report issued in International Application PCT/DE97/01441, mailed Nov. 12, 1997.
Voorheas et al., "Vector expansion in a large collection", NIST Special Publication, US, Gaithersburg, MD pp. 343-351.
F. Aurenhaivimer, Voronoi Diagrams—"A survey of a fundamental geometric data structure", ACM Computing Surveys, vol. 23, No. 3, Sep. 1991, pp. 345-405.
C.J. Date, "An Introduction to Database Systems, Sixth Edition", Addison-Wesley Publishing Company, pp. 52-65 (1995).
European Office Action issued in EP 00926837.6. mailed Nov. 28, 2006.
Richard G. Casey et al., "A Survey of Methods and Strategies in Character Segmentation", IEEE Transactions on Pattern Analysis and machine Intelligence, vol. 18, No. 7. pp. 690-706 (Jul. 1996).
Euroeean Office Action issued in EP 01127768.8, mailed Feb. 17, 2011.
English translation of Remy Mullot, "Les Documents Ecrits", Jan. 1, 2006, Lavoisier—Hermes Science, pp. 351-355, "Section 7.6.3 Reconnaissance des caracteres speciaux ou endommages".
Dave, et al., Mining the Peanut Gallery: Opinion Extraction and Semantic Classification of Product Reviews, ACM 1-58113-680-3/03/0005, May 20-24, 2003, pp. 1-10.
Dreier, Blog Fingerprinting: Identifying Anonymous Posts Written by an Author of Interest Using Word and Character Frequency Analysis, Master's Thesis, Naval Postgraduate School, Monterey, California, Sep. 2009, pp. 1-93.
Office Action issued in Canadian Application No. CA 2,776,891, mailed Oct. 22, 2013.
Office Action issued in Canadian Application No. CA 2,796,392, mailed Sep. 26, 2013.
Office Action issued in Canadian Application No. CA 2,796,392, mailed Apr. 30, 2014.
Office Action issued in Japanese Application No. 2012-532203, mailed Jul. 15, 2014.
Office Action issued in Canadian Application No. 2,776,891 dated May 13, 2014.
English language translation of Office Action issued in Japanese Application No. 2012-537459, mailed Jun. 17, 2014.
English language abstract and translation of JP 10-091712 published Apr. 10, 1998.
English language abstract and translation of JP 2003-524258 published Aug. 12, 2003.
English language abstract of JP 1-277977 published Nov. 8, 1989.
English language abstract of JP 2-186484 published Jul. 20, 1990.
English language abstract and translation of JP 7-271916 published Oct. 20, 1995.
English language abstract and translation of JP 11-184976 published Jul. 9, 1999.
English language abstract and translation of JP 2000-155803 published Jun. 6, 2000.
A. Krikelis et al., "Associative Processing and Processors" Computer, US, IEEE Computer Society, Long Beach, CA, US, vol. 27, No. 11, Nov. 1, 1994, pp. 12-17, XP000483129.
International Search Report issued in related International Application No. PCT/EP01/09577, mailed Nov. 5, 2003.
Motonobu Hattori, "Knowledge Processing System Using Mulit-Mode Associate Memory", IEEE, vol. 1, pp. 531-536 (May 4-9, 1998).
International Search Report issued in International Application No. PCT/EP01/01132, mailed May 30, 2001.
H. Saiga et al., "An OCR System for Business Cards", Proc. of the 2nd Int. Conf. on Document Analysis and Recognition, Oct. 20-22, 1993, pp. 802-805, XP002142832.
Junliang Xue et al., "Destination Address Block Location on handwritten Chinese Envelope", Proc. of the 5th Int. Conf. on Document Analysis and Recognition, Sep. 20-22, 1999, pp. 737-740, XP002142833.
Machine Translation of JP 11-184894.
Simon Berkovich et al., "Organization of Near Matching in Bit Attribute Matrix Applied to Associative Access Methods in Information Retrieval", Pro. of the 16th IASTED Int. Conf. Applied Informatics, Feb. 23-25, 1998, Garmisch-Partenkirchen, Germany.
European Office Action issued in Application No. 01127768.8 mailed Sep. 10, 2008.
European Office Action issued in Application No. 01120429.4 mailed Sep. 16, 2008.
D. Frietag, "Information extraction from HTML: application of a general machine learning approach". Pro. 15th National Conference on Artificial Intelligence (AAAI-98); Tenth Conference on Innovative Applications of Artificial Intelligence, Proceedings of the Fifteenth National Conference on Artificial Intelligence, Madison, WI, USA pp. 517-523, SP002197239 1998, Menlo Park, CA, USA, AAAI Press/MIT Press, USA ISBN: 0-262-51098-7.
European Office Action issued in Application No. 01120429.4 mailed Jun. 30, 2006.
European Office Action issued in Application No. 01120429.4 mailed Apr. 23, 2004.
E. Appiani et al., "Automatic document classification and indexing in high-volume applications", International Journal on Document Analysis and Recognition, Dec. 2001, Springer-Verlag, Germany, vol. 4, No. 2, pp. 69-83, XP002197240, ISSN: 1433-2833.
A. Ting et al., "Form recognition using linear structure", Pattern Recognition, Pergamon Press Inc., Elmsford, NY, US, vol. 32, No. 4, Apr. 1999, pp. 645-656, XP004157536, ISSN: 0031-3203.
International Search Report issued in International Application PCT/US02/27132 issued Nov. 12, 2002.
"East text search training"; Jan. 2000.
European Search Report issued in European Office Action 01120429.4 mailed Jul. 19, 2002.
International Search Report issued in International Office Action PCT/DE97/01441, mailed Nov. 12, 1997.
Voorheas et al., "Vector expansion in a large collection", NIST Special Publication, US. Gaithersburg, MD pp. 343-351.
M. Marchard et al., "A Convergence Theorem for Sequential Larning in Two-Layer Perceptrons", Europhysics Letters, vol. 11, No. 6, Mar. 15, 1990, pp. 487-492.
F. Aurenhammer, Voronoi Diagrams—"A survey fundamental geometric data structure", ACM Computing Surveys, vol. 23, No. 3, Sep. 1991, pp. 345-405.
C. Reyes et al., "A Clustering Technique for Random Data Classification", International Conference on Systems, Man and Cybernetics, IEEE, p. 316-321.
International Search Report issued in PCT/EP00/03097 mailed Sep. 14, 2000.
International Preliminary Examination Report issued in PCT/EP00/03097 mailed Jul. 31, 2001.
Written Opinion issued in PCT/EP00/03097 mailed Apr. 21, 2001.
Japanese Office Action issued in Japanese Application No. 2003-522903, mailed Jul. 29, 2008.
English language translation of Japanese Office Action issued in Japanese Application No. 2003-522903, mailed Jul. 29, 2008.
European Office Action issued in European Application No. 01 905 729.8, mailed Nov. 22, 2007.

(56) References Cited

OTHER PUBLICATIONS

Foreign Office Action issued in EP 00117850.8 mailed May 20, 2008.
Foreign Office Action issued in EP 00117850.8 mailed Jul. 20, 2006.
EP Search Report issued in EP 00117850.8 mailed Jun. 12, 2001.
International Notification issued in PCT/EP00/03097 mailed May 5, 2001.
G. Lapir, "Use of Associative Access Method for Information Retrieval System", Proc. 23rd Pittsburg Conf. on Modeling & Simulation, 1992, pp. 951-958.
Witten et al., "Managing Gigabytes" pp. 128-142.
C.J. Date, "An Introduction to Database Systems, Sixth Edition", Addison-Wesley Publishing Company,pp. 52-65 (1995).
International Search Report for PCT/US00/23784 mailed Oct. 26, 2000.
Australian Office Action in Australian application 2002331728 mailed Nov. 16, 2006.
Australian Notice of Acceptance issued in Australian application 2002331728 mailed Feb. 20, 2008.
Foreign Office Action issued in EP 01127768.8 mailed Feb. 5, 2007.
Foreign Office Action issued in EP 01127768.8 mailed Sep. 8, 2005.
Bo-ren Bai et al. "Syllable-based Chinese text/spoken documents retrieval using text/speech queries", Int'l Journal of Pattern Recognition.
Foreign Search Report issued in EP 01127768.8 mailed Sep. 12, 2002.
European Search Report issued in EP 00103810.8, mailed Aug. 1, 2000.
European Office Action issued in EP 00103810.8, mailed May 23, 2002.
International Preliminary Examination Report issued in International Application No. PCT/DE97/01441, mailed Jul. 21, 1998.
European Office Action issued in EP 00926837.6, mailed Nov. 28, 2006.
European Office Action issued in EP 00926837.6, mailed Oct. 11, 2007.
Australian Office Action issued in AU 2001282106, mailed Jul. 18, 2006.
Australian Office Action issued in AU 2001233736, mailed Aug. 26, 2005.
Australian Office Action issued in AU 2001233736, mailed Aug. 23, 2006.
European Office Action issued in EP 97931718.7, mailed Jul. 9, 2001.
European Office Action issued in EP 97931718.7, mailed May 8, 2002.
International Search Report issued in International Application No. PCT/EP98/00932, mailed Jul. 28, 1998.
Richard G. Casey et al., "A Survey of Methods and Strategies in Character Segmentation", IEEE Transactions on Pattern Analysis and machine Intelligence, vol. 18, No. 7, pp. 690-706 (Jul. 1996).
Office Action issued in Canadian Patent Application No. 2,459,182, mailed Oct. 26, 2010.
European Office Action issued in EP 01127768.8, mailed Feb. 17, 2011.
R.M. Lea et al., "An Associative File Store Using Fragments for Run-Time Indexing and Compression", SIGIR'80, Proceedings of the 3rd Annual ACM Conference on Research and Development in Information Retrieval, pp. 280-295 (1980).
M. Koga et al., "Lexical Search Approach for Character-String Recognition", DAS'98, LNCS 1655, pp. 115-129 (1999).
International Search Report issued in PCT/IB2010/003251, mailed May 2, 2011.
Written Opinion issued in PCT/IB2010/003251, mailed May 2, 2011.
International Search Report issued in PCT/IB2010/003250, mailed May 2, 2011.
Written Opinion issued in PCT/IB2010/003250, mailed May 2, 2011.
Suzanne Liebowitz Taylor et al., "Extraction of Data from Preprinted Forms," Machine Vision and Applications, vol. 5, pp. 211-222, Jan. 1992.
International Search Report issued in PCT/IB2010/050087, mailed May 27, 2011.
Written Opinion issued in PCT/IB2010/050087, mailed May 27, 2011.
James Wnek, "Learning to Identify Hundreds of Flex-Form Documents", IS&T /SPIE Conference on Document Recognition and Retrieval VI. San Jose, CA, SPIE vol. 3651, pp. 173-182 (Jan. 1999).
File History of U.S. Appl. No. 11/240,525.
File History of U.S. Appl. No. 09/561,196.
File History of U.S. Appl. No. 11/240,632.
File History of U.S. Appl. No. 10/362,027.
File History of U.S. Appl. No. 12/191,774.
File History of U.S. Appl. No. 12/106,450.
File History of U.S. Appl. No. 12/208,088.
File History of U.S. Appl. No. 12/570,412.
File History of U.S. Appl. No. 13/024,086.
Office Action issued in Canadian Application No. CA 2,419,776, dated Aug. 16, 2011.
Notice of Allowance issued in Canadian Application No. 2,459,182, dated Oct. 28, 2011.
James Wnek, "Learning to Identify Hundreds of Flex-Form Documents", IS&T/SPIE Conference on Document Recognition and Retrieval VI, San Jose, CA, SPIE vol. 3651, pp. 173-182 (Jan. 1999).
Partial English language translation of Office Action issued in Japanese Application No. 2012-532203, mailed Jul. 15, 2014.
English language abstract of JP 2009-238217, published Oct. 15, 2009.
English language abstract and machine translation of JP 2005-038077, published Feb. 10, 2005.
G. Salton et al., "A Vector Space Model for Automatic Indexing", Communications of the ACM, vol. 18, No. 11, pp. 613-620, Nov. 1975.
Office Action issued in Australian Application No. 2010311066 dated Oct. 29, 2014.
Suzanne Liebowitz Taylor et al., "Extraction of Data from Preprinted Forms", Machine Vision and Applications, vol. 5, No. 3, pp. 211-222 (1992).
Office Action issued in Australian Application No. 2010311067 dated Oct. 21, 2014.
Office Action issued in Japanese Application No. 2012-537458 mailed Jun. 17, 2014.
English language translation of Office Action issued in Japanese Application No. 2012-537458, mailed Jun. 17, 2014.
Office Action issued in Australian Application No. 2013205566 dated Dec. 9, 2014.
Stephen V. Rice et al., "The Fifth Annual Test of OCR Accuracy", Information Science Research institute, TR-96-01, Apr. 1996 (48 pages).
Thomas A. Nartker et al., "Software Tools and Test Data for Research and Testing of Page-Reading OCR Systems", IS&T/SPIE Symposium on Electronic Imaging Science and Technology, Jan. 2005 (11 pages).
Tim Kam Ho et al., "OCR with No Shape Training", International Conference on Pattern Recognition (2000) (4 pages).
Karen Kukich, "Techniques for Automatically Correcting Words in Text", ACM Computing Surveys, vol. 24, No. 4, pp. 377-439, Dec. 1992.
Atsuhiro Takasu, "An Approximate Multi-Word Matching Algorithm for Robust Document Retrieval", CIKM'06, Nov. 5-11, 2006 (9 pages).
Kenneth Ward Church et al., "Word Association Norms, Mutual Information, and Lexicography", Computational Linguistics, vol. 16, No. 1, pp. 22-29, Mar. 1990.
Anil N. Hirani et al., "Combining Frequency and Spatial Domain Information for Fast Interactive Image Noise Removal", Proceedings of the 23rd Annual Conference on Computer Graphics and interactive Techniques, pp. 269-276 (1996).

(56) References Cited

OTHER PUBLICATIONS

Leonid L. Rudin et al., "Nonlinear Total Variation Based Noise Removal Algorithms", Physica D, vol. 60, pp. 259-268 (1992).
Richard Alan Peters, II, "A New Algorithm for Image Noise Reduction Using Mathematical Morphology", IEEE Transactions on Image Processing, vol. 4, No. 3, pp. 554-568, May 1995.
George Nagy, "Twenty Years of Document Image Analysis in PAMI", IEEE Transactions on Pater Analysis and Machine Intelligence, vol. 22, No. 1, pp. 38-62, Jan. 2000.
Stephen V. Rice et al., "Optical Character Recognition: An Illustrated Guide to the Frontier", Kluwer Academic Publishers, Copyright Apr. 1999.
File History of U.S. Appl. No. 13/548,042.
File History of U.S. Appl. No. 10/204,756.
File History of U.S. Appl. No. 12/588,928.
File History of U.S. Appl. No. 12/610,915.
File History of U.S. Appl. No. 12/610,937.
File History of U.S. Appl. No. 13/477,645.
File History of U.S. Appl. No. 13/624,443.

* cited by examiner

METHOD FOR AUTOMATICALLY INDEXING DOCUMENTS

CROSS-REFERENCE TO RELATED APPLICATIONS

This application is a continuation of Ser. No. 12/106,450 filed Apr. 21, 2008, which is a continuation of Ser. No. 11/896,746 filed on Sep. 5, 2007, which is a continuation of Ser. No. 11/620,628 filed on Jan. 5, 2007 which is a continuation of Ser. No. 11/429,436 filed May 8, 2006 which is a continuation of Ser. No. 10/531,298 filed Apr. 14, 2005, which is the national stage filing under 35 U.S.C. §371 of international application No. PCT/US02/27132 filed Aug. 27, 2002, all of which applications and disclosures are incorporated herein in their entireties by reference.

FIELD OF THE INVENTION

The present invention relates to the processing of text documents, and in particular, to the automatic indexing of text documents.

BACKGROUND OF THE INVENTION

A typical way of structuring large volumes of data such that they can be easily accessed is to index the documents. This means that a document or a group of documents is referenced by an indexing term. A collection of such indexing terms then forms an index: This is exemplarily shown in FIG. 4.

In FIG. 4 address documents 410, 420, 430 contain address data on individual persons. The documents may be characterized by the individual elements which they contain, one of them is the family name of the persons to which the documents relate.

This information may then be used for building an index 440 shown on the left-hand side of FIG. 4. This index contains list of the family names which are contained in the documents, and each of the elements of the index references an individual document as can be seen from FIG. 4.

This is a very classical and typical way of organizing information in a structured manner such that the desired information or the desired documents containing a searched and desired piece of information may be retrieved and accessed from a large volume of documents.

Indexes can be built for several elements such as the family name, the first name, the street name, etc. What indexes have in common is that the elements of an index all in some sense have the same "meaning", such as "family name", "first name", or the like.

Therefore, the individual elements which are used to build an index are somehow consistent with respect to the information they contain when viewed from a more abstract level. In other words, all elements of the index have the same "meaning".

Another, more general approach for ordering documents is just to characterize one or more documents by a certain term, and then to build an index from the thus used individual terms. In such a case the index elements do not have to have a consistent "meaning", although one may consider that they all have the same meaning in the sense that each of the elements characterizes or describes the one or more documents which it references.

After an index has been built, it can be used for querying and accessing the set of documents ordered or structured by the thus built up index. Either one can directly input a search term, and if it is contained in the index, then the document or the documents referenced by the index term are retrieved. Another possibility is to "browse" the index, which means to display the individual index elements in some (typically alphabetical) order, as shown in element 440 of FIG. 4. This has the advantage that a user can quickly overlook which index elements are used in total for organizing or "indexing" the set of documents.

Another somewhat more sophisticated approach is to use a so-called fault-tolerant search, which means that a search term is inputted and those documents are retrieved where the corresponding index value is identical or at least similar (to some extent, depending on the used fault-tolerant search algorithm) to the search term.

In any case, building an index is a very difficult and tedious work, it is the preparatory work which has to been done in order to make it feasible to access large sets of documents in an ordered and meaningful manner.

Typically indexes are created "manually", at least in case of the documents to be indexed being "unstructured", such as plain text documents. If the documents to be indexed are "structured", such as in the case of relational data base tables, then it is relatively easy to built an index. However, if one does not know which individual "meaning" an element in an unstructured document has, then it is extremely difficult and tiresome to select elements which can be used for indexing this document.

Consequently, it is highly desirable to improve the processing of indexing documents.

SUMMARY OF THE INVENTION

According to the first embodiment of present invention there is provided a method for retrieving certain documents from a set of documents based on a search term inputted as well as based on the corresponding meaning of the search term. At first those documents are searched which contain the search term. Thereafter, the found documents (called base documents) are to be evaluated whether in those documents the search term contained therein has a certain meaning. This evaluation comprises the generation of a text (or layout) document which represents the search term and its surrounding elements and their corresponding absolute or relative position with respect to the search term or within the base document. This text document then is inputted into a trainable classifying apparatus which has been trained to judge whether the inputted text document belongs to a certain class or category or not. The judgment thereby has to determine whether the search term has the certain desired meaning (i.e. the text document belongs to the trained class) or whether it has not (the document does not belong to the trained class).

Based on this judgment it can be checked whether in the found based documents the searched terms have the certain desired meaning.

According to a further embodiment the search terms and the corresponding meanings can be used to built an index for the based documents. This can then be helpful to access a large stockpile of base documents in an ordered manner.

According to a further embodiment searching, classifying, and indexing steps are repeated for a plurality of search terms. If this is carried out for each of the base documents, then for each document the corresponding individual value having a certain meaning and being contained in this document can be determined. For example, for all base documents of a pool of letters the dispatch date may be determined or "extracted", and the thus extracted elements together with their meaning "dispatch date" could be used to form an index referencing the set of base documents. If this is performed for several different meanings, such as the addressee, the origination address, the reference number, and so on, then there could be also generated a relational data base mapping the "informational content" of the set of documents into the relational data base tables.

According to a further embodiment the search performed may comprise an associative search and/or a fuzzy search. This will return also documents in which the search terms are misspelled or which contain any other typing errors.

According to a further embodiment the training of a classifying apparatus can be carried out by selecting for the training set of documents those elements which in the respective documents have a certain meaning, then generate the text documents for the respective base documents of the training sample, and then using the thus generated text documents as a training set for training the classifying apparatus by running the classifying apparatus in the training mode.

Using this approach a classifying apparatus by using only a small sample of training documents can actually "learn" to evaluate whether for certain base documents some elements contained therein have a certain meaning or not. This so trained "knowledge" can then later on be used for building an index based on the certain meaning which the index elements should have.

The training process can either be done semi-automatically or it can be done in another embodiment in a fully automated manner. For the semi-automatic training a user has to identify in the base documents those elements which have the desired meaning which is to be learned or trained. After the identification has taken place the training sample is provided an the training can be carried out.

To carry out a fully automatic training one can use a set of documents (such as documents of a database which already exists) for which already the elements having the desired meaning are known, e.g. as fields in the database. This stock of documents for which the elements having the desired meaning are already known can then be used as training samples.

According to a further embodiment a set of base documents can be automatically indexed by checking for all elements (or at least a part of them) contained in set base documents whether those elements have a certain meaning or not. With this "pump gun" approach a set of base documents can be fully automatically indexed, without even performing any search. In this embodiment just all elements of the base documents are checked as to whether they have a certain desired meaning, and if so, then those elements are used for building up the index.

According to a further embodiment, the selection of the elements for which the actual checking is performed, may contain some "smart selection". For example, only those elements which meet some format criterion, could be selected for the evaluation procedure. This could then reduce the necessary computing power to perform the automatic indexing.

According to a further embodiment the one or more indexes which have been built up can be used for forming relational data base tables. Then, the unstructured-base documents can be automatically converted into a structured form of a relational data base.

DETAILED DESCRIPTION

The present invention will now be explained by means of illustrative embodiments in connection with the accompanying drawings.

Figure 1:
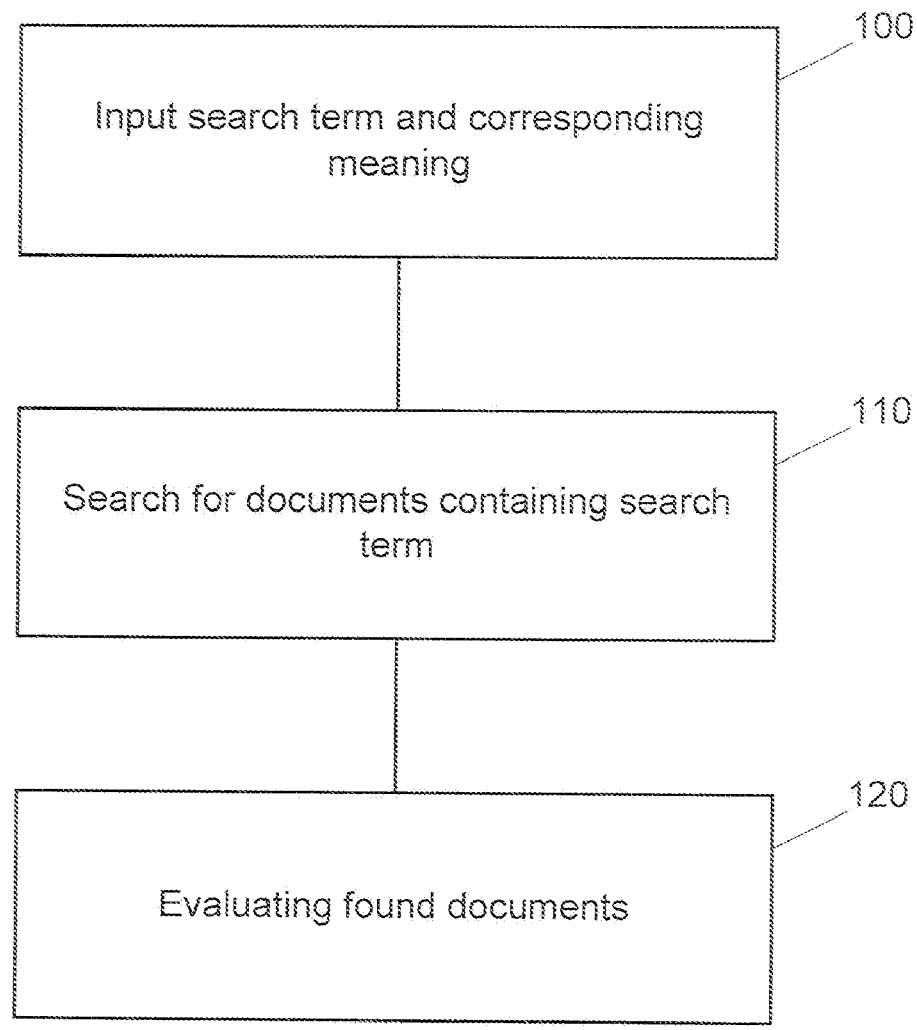
FIG. 1 schematically illustrates of first embodiment of present invention.

FIG. 1 illustrates a first embodiment according to the present invention. Assume that there is a set of documents which are unstructured (just normal text documents) and which accordingly are difficult to query, to access, and to bring them into somehow an ordered form.

Let us moreover assume that the user is interested in those documents of the pool of base documents which a) contain a certain term, and b) in which the certain term has a certain meaning. As an example let us assume that a user is interested in those documents of the pool of base documents which contain the term "May 6, 2000", but additionally, in which the term (or element) "May 6, 2000" is an invoice date.

At first a user then has to input the search term into the computer be using any conventional input method. Moreover, the corresponding meaning which the inputted search term should have also must be somehow conveyed to the computer system. Either the user could manually input the corresponding meaning (such as inputting "invoice date", or he could select from a variety of optional meanings, or the corresponding meaning could be predefined to a default value. After the search term and the corresponding meaning have been clarified by operation 100 in FIG. 1, the method proceeds to operation 110. Therein the pool of base documents is searched for those documents which contain the inputted search term.

This will retrieve any documents which contain the element "May 6, 2000". However, the retrieved documents may also contain those documents where the search term has a meaning different from the meaning "invoice date", e.g. the meaning could be "date of birth", "date of expiration", or anything else.

Therefore, in operation 120 it has to be evaluated whether the found documents are documents in which the search term has the desired corresponding meaning or not.

This evaluation procedure will now be explained in more detail in connection with FIG. 2. In operation 200 there is generated a text document which codes for positions of elements which surround the search term in the found base document. This is explained in very detail in European Patent Application 00103810.8, filed on Feb. 23, 2000, by the applicant of the present application, and the content of which is hereby incorporated by reference. In particular, this application deals with and describes a method which can be used for judging whether certain elements in a text have a certain meaning or not. This is done by representing their corresponding positions through a so-called "layout document", and this layout document then is inputted into a classifying apparatus which has been trained to recognize whether the inputted layout document belongs to a certain category or not.

The training usually is performed in order to enable the classifying apparatus to judge whether the layout document represents the surrounding area of a search term for those documents where the search term has any desired (or trained) meaning or not. For details, reference is made to the aforementioned European Patent Application. For example, the published version of the European Patent Application, EP 1128278 A1, includes the following at paragraphs [0023]-[0024]:

Apart from obtaining the elements themselves there is obtained their corresponding position in the document, e.g. by calculating the x- and y-coordinates where each element is located in the document. The position will later be used for generating the layout document.

Figure 3:
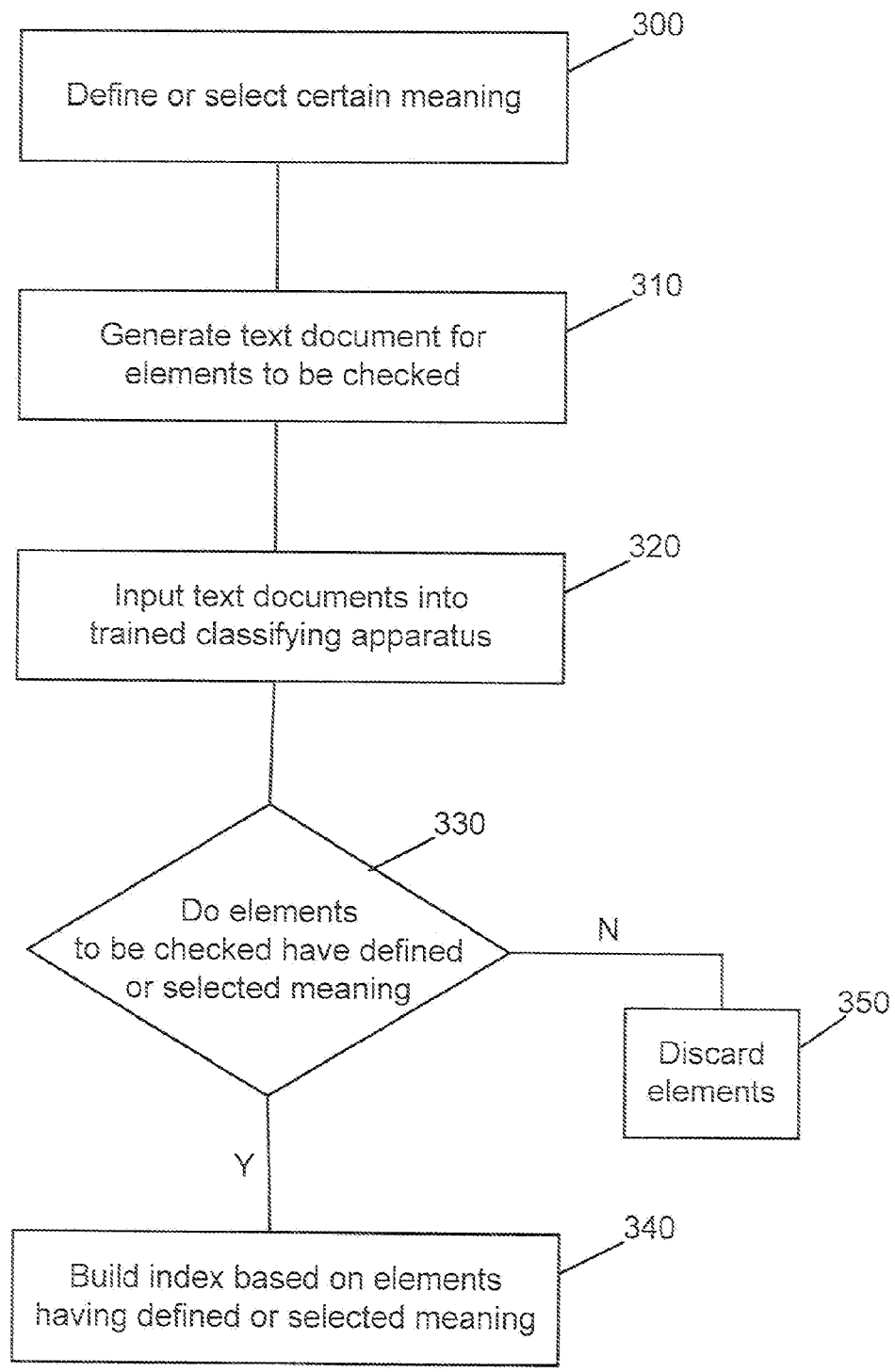
FIG. 3 schematically illustrates an even further embodiment of the present invention.
Figure 4:
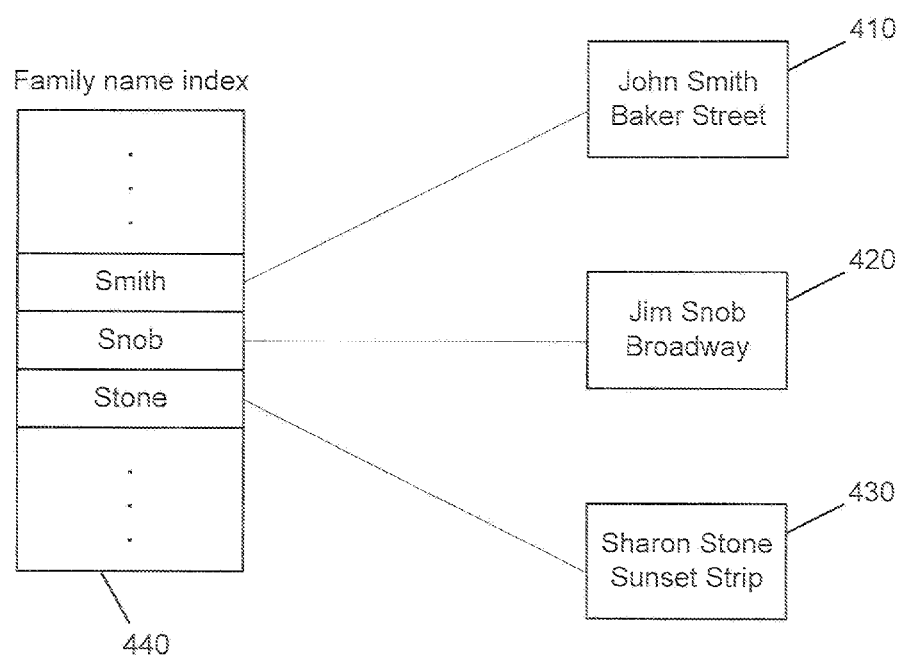
FIG. 4 schematically illustrates the indexing of documents.

After having identified the individual elements of the electronic text document, those elements are stored in a so-called "working document". In the working document each element which has been identified is stored together with information about its position in the electronic document. For example, the element "curriculum" may be stored together with its x- and y-coordinates identifying its position in the electronic document. The working document is a convenient tool for storing all elements which have been identified together with their corresponding position so that for the generation of the layout document which is explained later in detail reference can be made to the working document. An example of a working document generated from any text document is shown in FIG. 3. The tags Tag1, Tag2, etcetera contain the position information of the corresponding elements. This information may be represented in any form, e.g. by directly storing the x- and y-coordinates of the elements in the tags. The elements in FIG. 3 may be for example the individual words identified in a text document, or any other character sequences as identified through the method explained before as elements, and the tags then contain information about the position of those elements, such as where with respect to their x- and y-coordinates they are located. The tags may also further comprise indications of the style of the elements, their font, whether they are underlined or not, or any similar information. For example, for a bold faced element the corresponding tag may comprise the character sequence "bf" representing that the element is in bold faced characters, another character sequence may represent that the element is underlined, or the like.

Paragraph [0021] of European Patent Application 00103810.8 further teaches that an element may be "any sequence of characters which is separated from other elements by a delimiter". Thus, the classifying apparatus described herein may identify x- and y-coordinates for any element and its surrounding elements to judge whether the layout document represents the surrounding area of a search term.

Figure 2:
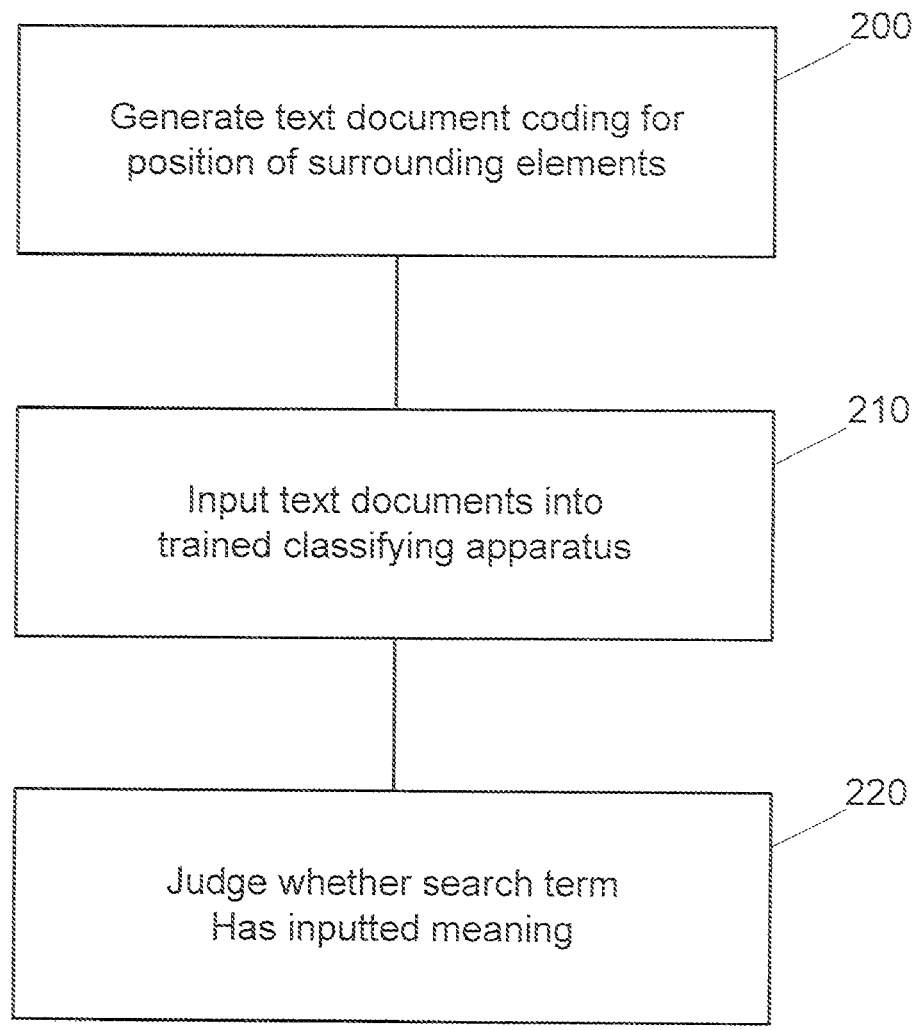
FIG. 2 schematically illustrates of further embodiment of present invention.

This layout document (or as we call it here, text document) is then used as in input into a classifying apparatus as illustrated in operation 210 of FIG. 2 of the present application. This classifying apparatus then judges whether the inputted text document belongs to a certain category or not. The "category" here means that either the search term has the certain meaning or it has not (here: it is an invoice date or it is not).

In operation 220 the classifying apparatus then performs its judgment whether the search term has the inputted (or desired) meaning or not. A particularly suited classifying apparatus is described in European Patent Application 99108354.4, which has been filed by the applicant of the present application on Apr. 28, 1999. The content of this application is hereby incorporated by reference. In particular, any details relating to the classifying apparatus described or mentioned herein can be taken from this application.

However, any other classifying apparatus which is able to evaluate text documents as to whether they belong to a certain category or not and which is trainable can be used as well. Of course, at first the classifying apparatus has to be trained using a certain training sample, and thereafter, the newly found base documents may be inputted into classifying apparatus and evaluated thereby has to whether the search term has a certain meaning or not.

It should be noted once again that a detailed description of the process to extract elements from text documents having a desired meaning is described in European Patent Application 00103810.8 mentioned before. Also the particulars concerning how a representation of the surrounding area of a candidate element my means of a layout document which is then fed to a trainable classifying apparatus to judge whether the candidate element actually has the desired meaning is described in detail therein.

A further embodiment of the present invention which relates to the automatic generation of any index is now explained in connection with FIG. 3. In operation 300 the certain meaning which the elements of the base documents should have is defined or selected, as already explained before.

Then, as also already has been explained, for elements to be checked the text document (or layout document) is generated.

This text documents may then be inputted into an already trained classifying apparatus in operation 320. This classifying apparatus in operation 330 then checks whether the elements to be checked have the certain defined or selected meaning.

If the evaluation results in a "yes", then in operation 340 the thus evaluated element is used to built an index together with the defined or selected meaning. If the answer in operation 330 is "no", then in operation 350 the checked elements are discarded or, in other words, they are not used for building the index.

Using the process illustrated in FIG. 3, an automatic indexing of documents can be performed.

This can be done in several ways. Either, the elements to be checked could be all elements which are contained in the individual base documents. For each individual element, it could then for example be checked whether this element is an "invoice date" or not, e.g. by generating a corresponding layout document, and then by evaluating this layout document through a classifying apparatus.

It is readily apparent, that this approach is rather time and computing power consuming, therefore, the selection of the elements to be checked could be done in some smart manner. For example, only those elements which match with a certain format criterion could be checked. With such a format criterion can be a compilation of the well-known formats which a date can assume, and the elements are checked whether they match with the format criterion and only in the letter case the final checking is made whether the thus selected element (which may be assumed to be "date") actually is an "invoice date" or not.

Another approach could be to automatically generate the search terms which then are searched in the base documents.

For example, a certain range of dates could be selected (e.g. from Jan. 1, 2000 to Jan. 1, 2001), and then all those dates lying therein between are subsequently searched, in other words, are applied as search terms to the pool of the base documents.

For those search terms where there is found a match, which means that there is found a document which contains a corresponding search term, the layout document then is generated and it is checked whether the search term has the certain meaning (here: invoice date). If so, then as already explained before the search term may be used for building an index.

With this approach, not all elements in the base documents have to be checked, but rather only those elements for which the search has delivered a match.

Which approach actually is more efficient in terms of necessary computing power may depend on the individual circumstances.

It should be clear that the foregoing examples only are illustrative examples, and that of course the method explained so far also can be applied to any other "meanings" which a certain term or element should have, such as e.g. a name, a street name, a family name, a first name, a city name, or anything else.

The most general meaning any element could have with respect to a certain document in which it is contained could be that the element just somehow "describes" the document in which it is contained. For example, the term "invoice" may be contained in an invoice, moreover, it just describes that the corresponding document actually is an invoice. Such elements describing the whole content of a document of course can also be used for building an index.

In a further embodiment the training of the classifying apparatus is carried out semi-automatically. E.g. a user identifies for each of a set of documents those elements which have the certain desired meaning such as e.g. the invoice number. Based on this selection inputted by the user then the layout document is generated which can be used as a training input for training the classifying apparatus. In this manner several layout documents representing surrounding areas of elements which are invoice numbers are inputted to the classifying apparatus and thereby the classifying apparatus is trained ("learns") to recognize those elements which are invoice numbers and to distinguish them from other elements which do not have this meaning.

In a further embodiment such a training procedure can be executed in a fully automated manner. Assume that there is a set of documents (e.g. from any already existing database) which are already stored, evaluated and classified in the form of a relational database which has a column "invoice number" in which for each document the invoice number is already stored. Then there is no need to identify the invoice number manually through a user but rather the information from the database can be used to generate the training input. The database provides the invoice number for each document, this number may then be searched in the document itself and after it has been located based on the surrounding area which surrounds the invoice number the layout document is generated. This process may be carried out for each of the documents of the database and then results in a large set of layout documents which can be used as training examples for training the classifying apparatus. Thereby a fully automated training can be carried out without any need for identifying elements by a user.

It should be clear to any skilled person that this procedure can be carried out not only for "invoice numbers" but for any other elements which have a certain meaning and which are already known. This knowledge about the elements themselves and their meaning needs not to come from a database, it may also be stored e.g. in a spreadsheet table, or it may even be written down on paper in form of a table which then may be scanned. It does not matter from where the knowledge about the elements themselves and their meaning comes, as soon as it exists it may be used to automate the training process of the classifying apparatus based on this knowledge.

In summary, embodiments of the invention include a method for retrieving based on a search term together with its corresponding meaning from a set of base documents those documents which contain said search term and in which said certain search term has said certain meaning to enable the building of an index on said retrieved documents, said method comprising: searching for those base documents among said set of base documents which contain said certain search term; evaluating the found base documents as to whether said search term contained in said found base documents, respectively, has a certain meaning, said evaluation comprising: generating a text document to represent elements surrounding the search term and their corresponding absolute or relative position with respect to said search term, the elements of said text document coding said absolute or relative positions of said surrounding elements by corresponding text strings; inputting said text document into a trainable classifying apparatus which has been trained to recognize whether an inputted text document belongs to a certain classification category or not, whereas said training has been performed based on a training sample of text documents which have been generated for documents in which the term surrounded by the surrounding elements has said meaning inputted by said user; classifying said inputted text document to judge whether said search term has said inputted meaning.

While the present invention has been described hereinbefore by means of exemplary embodiments, it will be readily apparent to the skilled reader that modifications may be carried out without departing from the scope of the invention as defined by the appending claims.

What is claimed:

1. A method for automatically indexing a set of base documents, said method comprising:
   inputting, with a computer device, data defining all elements respectively contained within the base documents which meet predefined criteria and defining a corresponding meaning, the elements comprising an element to be checked and surrounding elements that surround the element to be checked;
   evaluating, with a trainable classifying apparatus in communication with the computer device which has been trained to recognize whether inputted data belongs to a corresponding classification category or not, the received data as to whether the element to be checked has the corresponding meaning, wherein the training has been performed based on a training sample generated for base documents in which the element to be checked is surrounded by the surrounding elements and has the corresponding meaning, the received data comprising data coding absolute or relative positions of the surrounding elements by corresponding text strings; and
   for those base documents where elements have been found to have the corresponding meaning, building, with the computer device, an index indexing the base documents, the index comprising the elements having the corresponding meaning with a corresponding reference to the document in which each element is contained.

2. The method of claim 1, further comprising training said classifying apparatus.

3. The method of claim 2, wherein the training comprises using a set of documents for which the elements having the meaning of interest are already known to automatically generate text documents as training samples to train said classifying apparatus.

4. The method of claim 1, wherein the inputting comprises:
   evaluating, with the computer device, the base documents by checking for the elements respectively contained within the base documents which meet the predefined criteria and whether the elements have the corresponding meaning; and
   generating, with the computer device, the data based on the evaluating.

5. The method of claim 1, wherein:
the inputting comprises generating, with the computer device, the data; and
the data comprises a text document for the element to be checked, the text document being based on the element to be checked and its surrounding elements and including coding for the element's X-Y position and the X-Y positions of the surrounding elements.

6. A system for automatically indexing a set of base documents, said system comprising:
a trainable classifying apparatus configured for:
inputting, with a computer device, data defining all elements respectively contained within the base documents which meet predefined criteria and defining a corresponding meaning, the elements comprising an element to be checked and surrounding elements that surround the element to be checked;
evaluating, with the trainable classifying apparatus, which has been trained to recognize whether inputted data belongs to a corresponding classification category or not, the received data as to whether the element to be checked has the corresponding meaning, wherein the training has been performed based on a training sample generated for base documents in which the element to be checked is surrounded by the surrounding elements and has the corresponding meaning, the received data comprising data coding absolute or relative positions of the surrounding elements by corresponding text strings; and
for those base documents where elements have been found to have the corresponding meaning, building, with the computer device, an index indexing the base documents, the index comprising the elements having the corresponding meaning with a corresponding reference to the document in which each element is contained.

7. The system of claim 6, wherein the classifying apparatus is configured to be trained by using a set of documents for which the elements having the meaning of interest are already known to automatically generate text documents as training samples to train said classifying apparatus.

8. The system of claim 6, wherein the inputting comprises:
evaluating, with the computer device, the base documents by checking for the elements respectively contained within the base documents which meet the predefined criteria and whether the elements have the corresponding meaning; and
generating, with the computer device, the data based on the evaluating.

9. The system of claim 6, wherein:
the inputting comprises generating, with the computer device, the data; and
the data comprises a text document for the element to be checked, the text document being based on the element to be checked and its surrounding elements and including coding for the element's X-Y position and the X-Y positions of the surrounding elements.

\* \* \* \* \*